(12) United States Patent
Gonzalez et al.

(10) Patent No.: US 10,247,169 B2
(45) Date of Patent: Apr. 2, 2019

(54) MEANS FOR ALLEVIATING STRAIN ON A WIND TURBINE ROTOR BLADE

(71) Applicant: Siemens Aktiengesellschaft, München (DE)

(72) Inventors: Alejandro Gomez Gonzalez, Aarhus (DK); Alex Loeven, Herning (DK); Sigmund Wenningsted Torgard, Fredericia (DK)

(73) Assignee: Siemens Aktiengesellschaft (DE)

( * ) Notice: Subject to any disclaimer, the term of this patent is extended or adjusted under 35 U.S.C. 154(b) by 274 days.

(21) Appl. No.: 15/101,043

(22) PCT Filed: Jan. 22, 2015

(86) PCT No.: PCT/EP2015/051259
§ 371 (c)(1),
(2) Date: Jun. 2, 2016

(87) PCT Pub. No.: WO2015/121044
PCT Pub. Date: Aug. 20, 2015

(65) Prior Publication Data
US 2016/0369775 A1 Dec. 22, 2016

(30) Foreign Application Priority Data

Feb. 12, 2014 (EP) .................................. 14154895

(51) Int. Cl.
*F03D 1/06* (2006.01)
*F03D 7/02* (2006.01)

(52) U.S. Cl.
CPC ......... *F03D 7/0236* (2013.01); *F03D 1/0641* (2013.01); *F03D 1/0683* (2013.01);
(Continued)

(58) Field of Classification Search
CPC ........ F03D 7/0235; F03D 7/0296; B64C 3/48
See application file for complete search history.

(56) References Cited

U.S. PATENT DOCUMENTS 7,413,408 B1 * 8/2008 Tafoya .................... B64C 21/10
416/228
7,922,450 B2 4/2011 Narasimalu
(Continued)

FOREIGN PATENT DOCUMENTS

EP 2423104 A1 * 2/2012 ............... B64C 3/48
EP 2647835 A1 10/2013
(Continued)

OTHER PUBLICATIONS

International Search Report for PCT application No. PCT/EP2015/051259, dated Mar. 31, 2015.
(Continued)

*Primary Examiner* — Woody A Lee, Jr.
(74) *Attorney, Agent, or Firm* — Schmeiser, Olsen & Watts, LLP

(57) ABSTRACT

A rotor blade for a wind turbine with an aerodynamic device, and an aerodynamic device is provided. The rotor blade includes a main body defining a pressure side and a suction side of the rotor blade, and includes a main body trailing edge section. The rotor blade includes an aerodynamic device with an attachment section for attaching the aerodynamic device to the main body trailing edge section, an aerodynamic section for influencing the aerodynamic properties of the rotor blade, and a buckling section for controlling the orientation and/or the shape of the aerodynamic section with regard to the main body. The aerodynamic device is configured such that it deforms elastically for a force component acting in flapwise direction on the buckling section, and deforms abruptly if a force component of about the size of the stability limit of the buckling section acts in flapwise direction on the buckling section.

18 Claims, 11 Drawing Sheets

(52) U.S. Cl.
CPC ...... *F03D 7/0296* (2013.01); *F05B 2240/311* (2013.01); *Y02E 10/721* (2013.01)

(56) References Cited

U.S. PATENT DOCUMENTS

| | | | | |
|---|---|---|---|---|
| 9,458,821 | B2* | 10/2016 | Jacobsen | F03D 1/06 |
| 9,617,974 | B2* | 4/2017 | Singh | F03D 1/0633 |
| 9,803,617 | B2* | 10/2017 | Merzhaeuser | F03D 1/0675 |
| 9,945,357 | B2* | 4/2018 | Enevoldsen | F03D 7/0204 |
| 2004/0105752 | A1* | 6/2004 | Wobben | F03D 1/0641 |
| | | | | 415/4.1 |
| 2011/0042524 | A1 | 2/2011 | Hemmelgarn | |
| 2011/0142635 | A1* | 6/2011 | Fritz | F03D 1/0675 |
| | | | | 416/62 |

FOREIGN PATENT DOCUMENTS

| | | | |
|---|---|---|---|
| WO | WO 2011064214 | A2 | 6/2011 |
| WO | 2011088834 | A2 | 7/2011 |
| WO | WO 2014049330 | A1 | 4/2014 |

OTHER PUBLICATIONS

Written Opinion for PCT Application No. PCT/EP2015/051259, dated Mar. 31, 2015.
Yamaguchi et al: "Basic Theory of Platesand Elastic Stability," Dec. 31, 1999 (Dec. 31, 1999). pp. 1-30.

\* cited by examiner

FIG 7
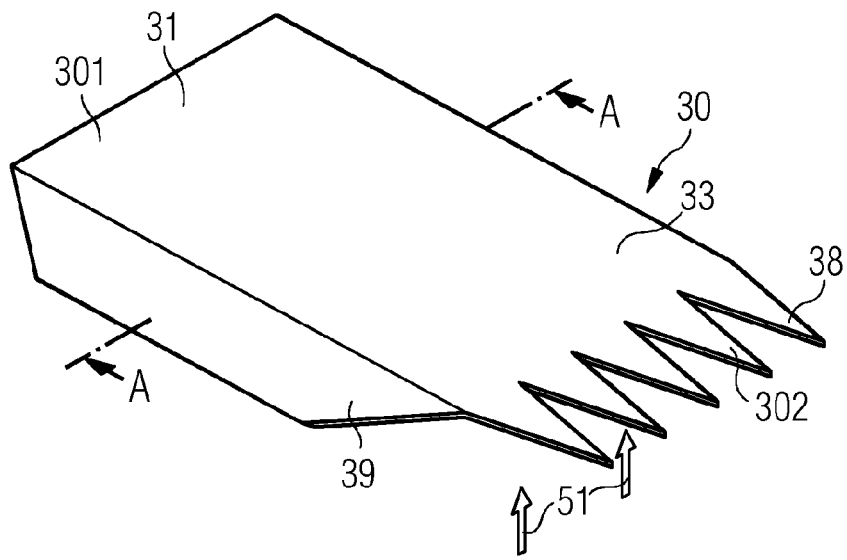
FIG 8
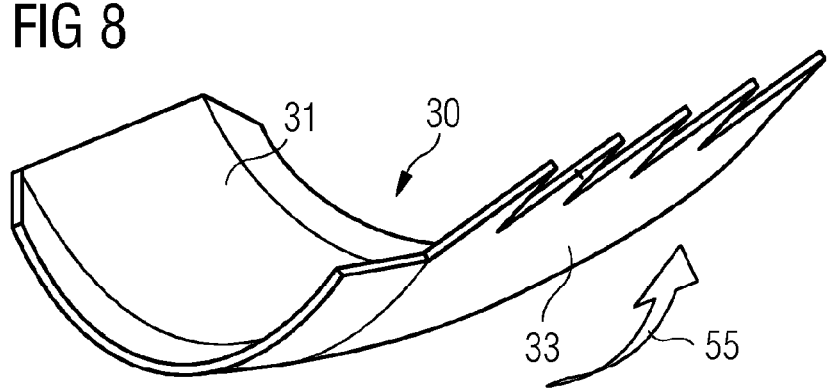
FIG 9  A-A
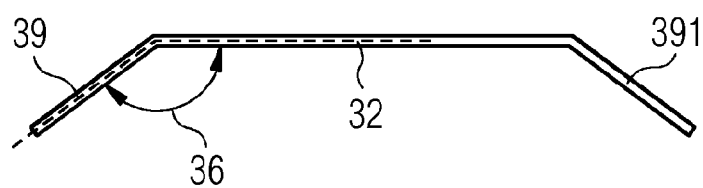

MEANS FOR ALLEVIATING STRAIN ON A WIND TURBINE ROTOR BLADE

CROSS-REFERENCE TO RELATED APPLICATIONS

This application claims priority to PCT Application No. PCT/EP2015/051259, having a filing date of Jan. 22, 2015, based off of European application No. EP 14154895.8 having a filing date of Feb. 12, 2014, the entire contents of which are hereby incorporated by reference.

FIELD OF TECHNOLOGY

The following relates to a rotor blade for a wind turbine comprising an aerodynamic device for influencing the aerodynamic properties of the rotor blade. Furthermore, the following relates to the aerodynamic device of such a rotor blade.

BACKGROUND

A mechanism to reduce extreme loads, which may be caused by events such as gusts, overspeed, emergency stops or the like, is desirable for wind turbines. It is advantageous to reduce extreme loads, as this potentially increases lifetime and durability of the wind turbine. A beneficial consequence of preventing, or at least mitigating, the occurrence and the impact of extreme loads is that this would enable to design and provide wind turbines with a larger rotor diameter compared to the state of the art.

In the field of aircraft, retractable flaps are a common means for reducing high loads on airplane wings. In particular, by moving out the retractable flaps on airplane wings, the lift force at take-off and landing is maximized; while during cruise the aerodynamic drag force is reduced by retracting the flaps. The retracting function is usually achieved by a mechanism comprising electric, hydraulic and/or mechanical actuators. Retractable flaps are typically controlled by the flight computer system and/or the pilot.

In a wind turbine, applying a similar concept of maximizing the lift force during normal operation, but reducing it during extreme loads would be advantageous, too. However, such an actuation and control system as it is known from airplanes has the drawbacks of relatively high costs, high durability requirements and the difficulty of access for servicing the system.

Therefore, a passive or semi-passive system, i.e. a system that responds passively or semi-passively to loads and forces acting on the rotor blade, seems to be a promising and efficient solution for rotor blades of wind turbines.

The US patent application 2011/0042524 A1 proposes passive adaptive structures for rotor blades of a wind turbine. In particular, it discloses different concepts and embodiments how to realize a rotor blade that passively changes its shape if extreme loads apply on the rotor blade. For instance, structural elements, which build up the web of the rotor blade and support the shell of the rotor blade, may be provided by a buckling region. Alternatively, the shell itself may comprise a buckling region. A disadvantage of the proposed passive adaptive structures is that it requires significant changes and re-design of the rotor blade. Thus, it is not possible to retrofit existing rotor blades by the proposed concept. Furthermore, also the design of a new rotor blade implementing the proposed concept seems to imply considerable costs and efforts.

Note that the international patent application WO 2011/088834 A2 and the international patent application WO 2014/049330 A1 both disclose adaptive elements which, however, do not address flapwise forces but which aim to compensate edgewise deformations of the rotor blade.

Thus, it would be desirable to provide an alternative concept of reducing loads on a rotor blade of a wind turbine. In particular, the occurrence and/or the impact of extreme loads, i.e. maximum loads acting on the rotor blade, shall be mitigated.

SUMMARY

According to embodiments of the invention, there is provided a rotor blade for a wind turbine, wherein the rotor blade comprises a main body defining a pressure side and a suction side of the rotor blade. The rotor blade furthermore comprises an aerodynamic device wherein the aerodynamic device comprises an attachment section for attaching the aerodynamic device to a main body trailing edge section of the main body, an aerodynamic section for influencing the aerodynamic properties of the rotor blade, and a buckling section for controlling the configuration of the aerodynamic section with regard to the main body. The aerodynamic device is configured such that

- it deforms elastically for a force component acting in flapwise direction on the buckling section;
- it deforms abruptly if a force component of about the size of the stability limit of the buckling section acts in flapwise direction on the buckling section;
- the configuration of the aerodynamic section with regard to the main body is changed if the buckling section deforms abruptly; and
- load on the rotor blade is alleviated due to the change of the configuration of the aerodynamic section.

The rotor blade is suitable for being used in a wind turbine. In particular, it is a rotor blade of a wind turbine.

A wind turbine refers to a device that converts kinetic energy from wind in rotational energy. The rotational energy is subsequently used for generating electricity. A wind turbine is also referred to as a wind power plant.

The main body builds the main part of the rotor blade. The main body builds in principle a fully operable and fully working rotor blade for a wind turbine. Embodiments of the invention show how such a main body may be amended such that an improved rotor blade is obtained.

The main body defines the outer surface, i.e. the shape, of the rotor blade, except for the part of the rotor blade which is realized by the aerodynamic device. The shape relates particularly to the aerodynamic shape of the rotor blade which is of significant importance for the aerodynamic efficiency of the rotor blade and, thus, for the performance of the wind turbine comprising such a rotor blade.

The main body comprises a main body trailing edge section at which the aerodynamic device is attached to. In these spanwise regions of the rotor blade, where no aerodynamic devices are attached to, the main body trailing edge section represents the trailing edge section of the rotor blade.

Likewise, a leading edge section can be attributed to the main body, which is referred to as the main body leading edge section. The main body leading edge section represents the leading edge section of the whole rotor blade.

The aerodynamic device is subdivided into three sections: an attachment section, a buckling section and an aerodynamic section.

The aerodynamic device may be built as one single piece. Alternatively, it may also be made of several separate pieces which are connected to each other in order to form the aerodynamic device. The purpose of the attachment section is to realize a reliable and long lasting attachment of the aerodynamic device to the main body. The aerodynamic device may be attached at the pressure side of the main body trailing edge section or at the suction side of the main body trailing edge section. It may even be attached to both, the pressure side and the suction side.

After attachment of the aerodynamic device to the main body, there might be present a separation, i.e. a slot, between the main body and the aerodynamic device.

Preferably, these two parts are connected closely to each other such that a smooth transition from the main body to the aerodynamic device is provided. This has the advantage of improving the aerodynamic properties by, for instance, reducing vortices and eddies at the interface between the main body and the aerodynamic device.

The function of the aerodynamic section of the aerodynamic device is a favorable influence on the aerodynamic properties of the rotor blade. This encompasses, for instance, increasing the lift of the rotor blade. Alternatively or additionally, it may also reduce the noise that is emitted by the rotor blade during operation of the wind turbine. Also other functions are possible, such as a reinforcement of the structure of the rotor blade.

The function of the buckling section of the aerodynamic device is the control of the configuration of the aerodynamic section with regard to the main body. The term "configuration" in this context relates to the orientation and/or the shape of the aerodynamic section with regard to the main body. Thus, it may also be stated that the buckling section is aimed to control the orientation and/or the shape of the aerodynamic section with regard to the main body.

The aerodynamic device is configured such that it fulfills the following characteristics: It deforms in a reversible manner if a force component is acting in a flapwise direction on the buckling section. It is understood that any force is composed by force components. To give an example, in the Cartesian coordinate system, a force is composed by a first force component in the direction of the x-axis, a second force component in the direction of the y-axis, and a third force component in the direction of the z-axis.

In the inertial frame of reference of a rotor blade, a first force component in flapwise direction of the rotor blade can be defined, a second force component in edgewise direction of the rotor blade, and a third force component in the direction which is perpendicular to the flapwise and the edgewise direction.

In the context of this application, the "force component acting in flapwise direction" refers to the force component of the force acting on the rotor blade in the flapwise direction. The flapwise direction is defined as direction from the suction side to the pressure side or vice versa. In other words, the flapwise direction is perpendicular to the span and perpendicular to the chord.

Thus, embodiments of the invention provide a buckling section which buckles if forces in flapwise direction act on the buckling section. The buckling section is not aimed to buckle if, for instance, a force acting purely in edgewise direction acts on it.

Furthermore, it shall be understood that the elastic and reversible behavior of the deformation of the buckling section is only valid for the relevant range of applied forces to the buckling section. Thus, apart from the stability limit, there also exists an elasticity limit of the buckling section. For forces exceeding the elasticity limit, the buckling section may deform permanently, in other words inelastically.

Another feature of the aerodynamic device is that it deforms abruptly if a force of about the size of the stability limit of the buckling section acts in substantially flapwise direction on the buckling section. In this context, the notion "about" includes deviations of up to 20%.

In other words, a predetermined force can be assigned to the buckling section. This predetermined force is also referred to as the stability limit, at which the buckling section deforms suddenly and strongly. Note that this is also expressed by choosing the notion "buckling".

For forces between the stability limit and the elasticity limit, the increase of further deformation, if a further force or load is applied to the buckling section, may be different. In other words, several possibilities exist for loads between the stability limit and the elasticity limit. As a consequence of the deformation of the buckling section, the configuration, i.e. the orientation and/or the shape, of the aerodynamic section is changed. In particular, it is changed such that load on the rotor blade is alleviated.

A key aspect of embodiments of the present invention is that by providing and carefully choosing an aerodynamic device comprising a buckling section, it is possible to provide a rotor blade with an aerodynamic device that increases the lift in a broad range of relevant loads acting on the aerodynamic device, but which reduces the lift in the range of extreme, i.e. maximum loads. As being of considerably benefit for the provided rotor blade, this control mechanism is carried out passively. This has the advantage that maintenance of the system is easier and costs are lower compared to actively actuated control mechanisms. Additionally, a significant re-design of the rotor blade is not necessary.

Note that the notion "trailing edge section" refers to the section of the rotor blade in chordwise direction that belongs to the outer 20% of the chord length as measured from the trailing edge.

Likewise, the leading edge section refers to the section of the rotor blade that is comprised by the outer 20% of the chord length as determined from the leading edge.

In an embodiment of the invention, the aerodynamic device is shaped as a flap.

A flap may also be described as a panel. A flap that is attached to the trailing edge section of a rotor blade has been proven to be an efficient way of improving the lift characteristics and performance of the rotor blade.

The flap may be designed as a plane panel extension of the rotor blade. It may also have a slight airfoil profile. Preferably, the aerodynamic section of the aerodynamic device comprises a plurality of serrations for reducing emission of noise.

A serrated aerodynamic section may even further increase the lift and, thus, the performance of the rotor blade. Furthermore, the noise is reduced due to the fact that vortices are deviated and/or splitted by substituting the straight and plain trailing edge in substantially spanwise direction by a trailing edge that is oriented in a predetermined angle to the spanwise direction of the rotor blade. This has a beneficial effect of mitigating and reducing vortices and noise which is generated at the trailing edge of the rotor blade.

In another embodiment of the invention, the buckling section comprises a non-linear spring for realizing the abrupt deformation if a force of about the size of the stability limit of the buckling section acts in substantially flapwise direction on the buckling section.

A spring, might be a conventional spring with a non-linear force to deflection ratio.

Another way of realizing the buckling function of the buckling section is the choice of material of the buckling section. Preferably, the buckling section is made of rubber or silicone in order to realize the abrupt deformation if a force of about the size of the stability limit acts on the buckling section. These materials also have the advantage that they have a long lifetime and may last in a good condition even under the harsh conditions of, for instance, offshore wind turbines.

The whole aerodynamic device may be made of such a buckling material. Alternatively, only the buckling section as such is made of buckling material, while the attachment section and/or the aerodynamic section are stiff and rigid. Obviously, at certain forces acting on the aerodynamic device even these sections of the aerodynamic device may deform and ultimately break, thus are not rigid anymore.

In another embodiment, the attachment section comprises a device leading edge section and a device trailing edge section. The aerodynamic device is attached with the device leading edge section to the main body trailing edge section. Furthermore, the device trailing edge section builds the trailing edge section of the rotor blade.

In other words, in this specific spanwise section of the rotor blade, wherein the aerodynamic device is attached to the main body of the rotor blade, the device trailing edge section becomes the trailing edge section of the whole rotor blade. In the remaining parts of the rotor blade, the main body trailing edge section represents the trailing edge section of the rotor blade.

Regarding the spanwise dimension of the aerodynamic device, the aerodynamic device may cover the entire rotor blade. Preferably, the aerodynamic device is attached to specific spanwise parts of the rotor blade. For instance, the outer third of the rotor blade may comprise an aerodynamic device as described above.

In another embodiment, the aerodynamic device comprises at least one stabilizer for reducing the deformation of the aerodynamic device in substantially flapwise direction. The stabilizer reduces the deformation of the aerodynamic device in particular for forces which are smaller than the stability limit of the buckling section.

The stabilizer is also referred to as stabilizing element or stabilizing device.

It is advantageous if the aerodynamic device does not significantly deform for forces which are smaller than the stability limit of the buckling section. In other words, it is preferred that the aerodynamic device is rather stiff until the stability limit and only then deforms considerably. Note that significant deformation in this case occurs abruptly. In order to ensure that deformation of the aerodynamic device is small for small forces, the stabilizer is used. Note that for large forces, for instance for forces which are between the stability limit and the elasticity limit, the stabilizer may deform in substantially flapwise direction as well.

In a preferred embodiment the stabilizer extends in substantially chordwise direction of the rotor blade.

Assuming an aerodynamic device which is shaped and attached to the main body such that it comprises a first edge directed towards the root section of the rotor blade and a second edge directed towards the tip of the rotor blade, and assumed that these edges run substantially in chordwise direction of the rotor blade, it is advantageous to place and design the stabilizer such that the stabilizers also extend in substantially chordwise direction. The edges which delimit the aerodynamic device are also referred to as the radially inner edge for the edge that is directed towards the root section of the rotor blade, and the radially outer edge for the edge which is directed towards the tip section of the rotor blade.

In another embodiment, the stabilizer delimits the aerodynamic device at its radially inner edge and a further stabilizer delimits the aerodynamic device at its radially outer edge.

In other words, the aerodynamic device comprises a stabilizer and at least a further stabilizer. In the case that several aerodynamic devices are arranged one next to the other along the spanwise direction of the rotor blade, the further stabilizer of the first aerodynamic device may be closely connected or even attached to the stabilizer of the adjacent, second aerodynamic device.

In another embodiment of the invention, the stabilizer builds an angle which is smaller than 150 degrees, in particular smaller than 120 degrees with the buckling section.

Preferably, the stabilizer builds an angle of substantially 90 degrees with the buckling section.

This enables a stable and reliable construction for reinforcing the aerodynamic device against forces in flapwise direction.

In another embodiment, the stabilizer is bent towards the pressure side or towards the suction side of the rotor blade.

If, in a first alternative, the stabilizer is bent towards the pressure side and a force is applied on the aerodynamic device in the direction from the pressure side to the suction side, the stabilizer is bent or twisted as well when the aerodynamic device is deformed.

If, in a second alternative, the stabilizer is bent or configured towards the suction side and the force which is applied on the aerodynamic device comes from the pressure side to the suction side, then at the buckling region, the stabilizers might be compressed.

Preferably corrugations are provided for a more favorable configuration, particularly in the state after the aerodynamic device has been abruptly and considerably deformed due to forces of about the size of the stability limit. In other words, the corrugation is able to control more accurately the abrupt deformation of the buckling section if a force of about the size of the stability limit of the buckling section acts in substantially flapwise direction on the buckling section.

In another embodiment of the invention, the buckling section of the aerodynamic device comprises a first end and a second end, wherein the first end is attached to the main body trailing edge section, and the second end is attached to the aerodynamic section of the aerodynamic device.

In other words, in this embodiment, the aerodynamic device is attached to the main body of the rotor blade not only via the attachment section of the aerodynamic device, but additionally via the buckling section itself.

This has the general advantage of having alternative design choices. Furthermore, this has the specific advantage that the aerodynamic section may be designed similarly to conventional aerodynamic devices, such as spoilers, flaps and the like.

Note that the aerodynamic device may be built as one single, unitary piece or may be made of several pieces, which are attached together. For instance, the buckling section may be manufactured separately from the aerodynamic section and the attachment section. In other words, the buckling section may form a first part and the aerodynamic section and attachment section may form a second part.

In another embodiment, the aerodynamic device comprises a plurality of connection members for connecting the aerodynamic section of the aerodynamic device to the main body trailing edge section. Each connection member comprises a buckling section and an attachment section.

In this case, the attachment section and the buckling section form a first part, which is denoted here as the "connection member", and the aerodynamic device builds the second part. This embodiment also has the advantage that the aerodynamic device, such as a conventional flap, can be manufactured and provided as in the state of the art, and that only the connection of the flap to the remaining rotor blade has to be re-designed by including the buckling properties therein.

Furthermore, embodiments of the invention are also directed towards an aerodynamic device of a rotor blade as described above. Features and elements which have been described in the context of the rotor blade also apply to the aerodynamic device as such.

BRIEF DESCRIPTION

Some of the embodiments will be described in detail, with reference to the following figures, wherein like designations denote like members, wherein:

FIG. 7 shows a second embodiment of an aerodynamic device in an undeformed state;

FIG. 8 shows the second embodiment of the aerodynamic device in a deformed state;

FIG. 9 shows a cross sectional view of the second embodiment of the aerodynamic device;

The illustration in the drawings is in schematic form. It is noted that in different figures, similar or identical elements may be provided with the same reference signs.

DETAILED DESCRIPTION

Figure 1:
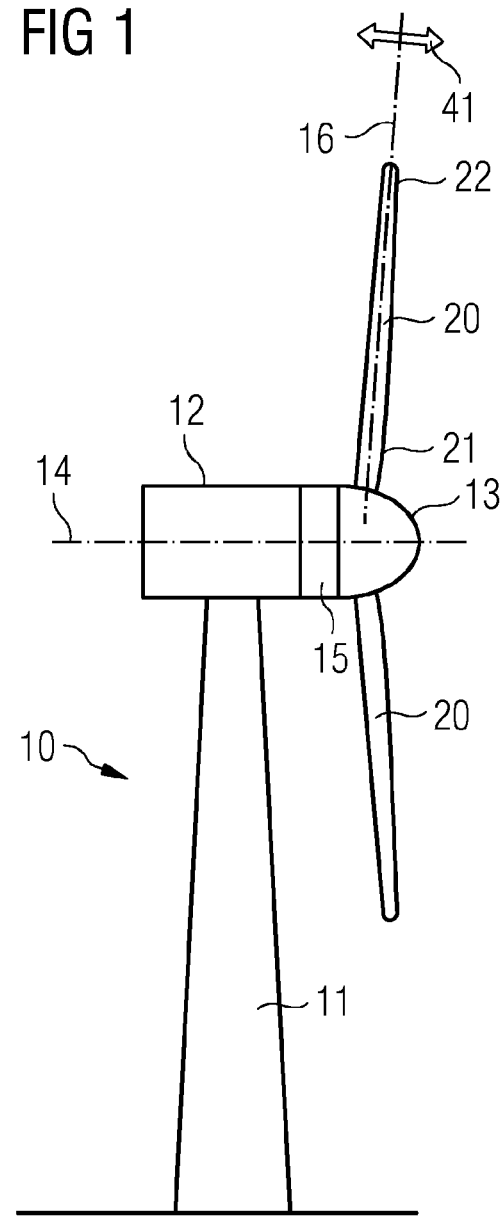
FIG. 1 shows an embodiment of a wind turbine.

In FIG. 1, a wind turbine 10 is shown. The wind turbine 10 comprises a nacelle 12 and a tower 11. The nacelle 12 is mounted at the top of the tower 11. The nacelle 12 is mounted rotatable with regard to the tower 11 by means of a yaw bearing. The axis of rotation of the nacelle 12 with regard to the tower 11 is referred to as the yaw axis.

The wind turbine 10 also comprises a hub 13 with three rotor blades 20 (of which two rotor blades 20 are depicted in FIG. 1). The hub 13 is mounted rotatable with regard to the nacelle 12 by means of a main bearing. The hub 13 is mounted rotatable about a rotor axis of rotation 14.

The wind turbine 10 furthermore comprises a main shaft, which connects the hub 13 with a rotor of a generator 15. The hub 13 is connected directly to the rotor, thus the wind turbine 10 is referred to as a gearless, direct driven wind turbine. As an alternative, the hub 13 may also be connected to the rotor via a gearbox. This type of wind turbine is referred to as a geared wind turbine.

The generator 15 is accommodated within the nacelle 12. It comprises the rotor and a stator. The generator 15 is arranged and prepared for converting the rotational energy from the rotor into electrical energy.

Furthermore, FIG. 1 visualizes the flapwise direction 41, as defined for the inertial frame of reference of the rotor blade 20. The flapwise direction 41 is perpendicular to the pitch axis 16 and perpendicular to the chord line (not visible in FIG. 1).

Figure 2:
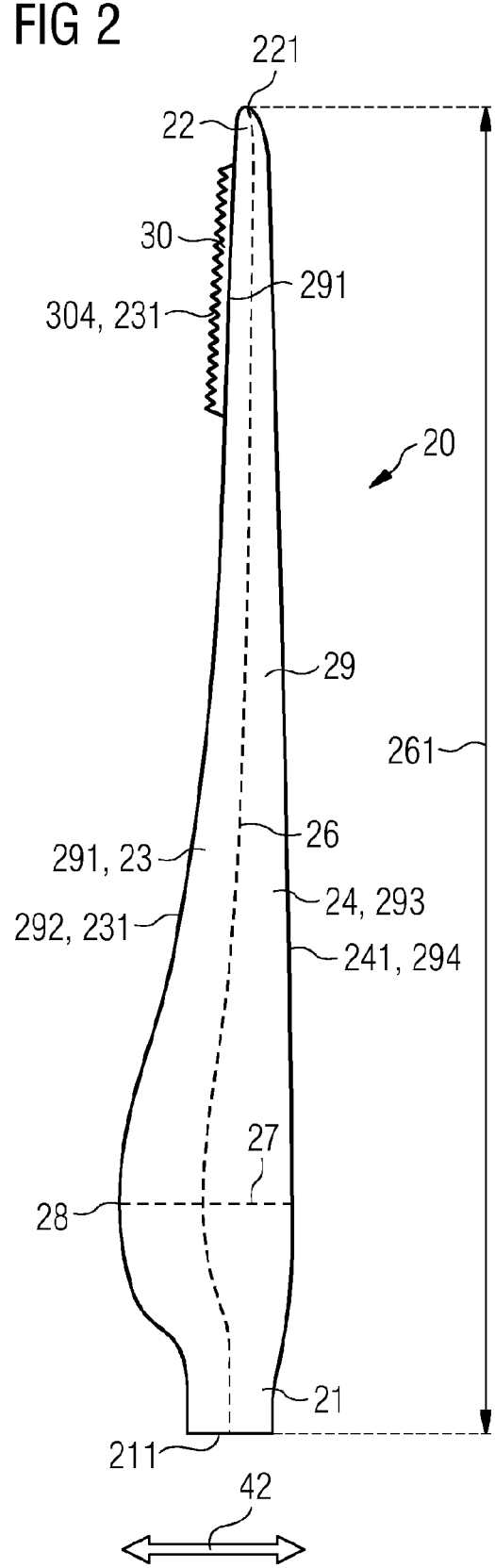
FIG. 2 shows an embodiment of a rotor blade of a wind turbine.

FIG. 2 shows a rotor blade 20 of a wind turbine. The rotor blade 20 comprises a root section 21 with a root 211 and a tip section 22 with a tip 221. The root 211 and the tip 221 are virtually connected by the span 26 which follows the shape of the rotor blade 20. If the rotor blade were a rectangular shaped object, the span 26 would be a straight line. However, as the rotor blade 20 features a varying thickness, the span 26 is slightly curved or bent as well. Note that if the rotor blade 20 was bent itself, then the span 26 would be bent, too.

The rotor blade 20 comprises a main body 29 and an aerodynamic device 30, wherein the aerodynamic device 30 is attached to the main body 29. The main body 29 comprises a main body leading edge section 293 with a main body leading edge 294. Likewise, the main body 29 also comprises a main body trailing edge section 291 with a main body trailing edge 292. The main body trailing edge section 291 surrounds the main body trailing edge 292. The main body leading edge section 293 surrounds the main body leading edge 294.

The aerodynamic device 30 comprises a device leading edge section with a device leading edge. The aerodynamic device 30 also comprises a device trailing edge section with a device trailing edge 304.

As already mentioned, the rotor blade 20 is defined as the combination of the main body 29 and the aerodynamic device 30. A trailing edge section 23 and a leading edge section 24 is assigned to the rotor blade 20 as a whole. As the aerodynamic device 30 is attached to the main body trailing edge section 291 and not to the main body leading edge section 293, the main body leading edge section 293 becomes, i.e. coincides, with the leading edge section 24 of the (whole) rotor blade 20. Likewise, the main body leading edge 294 becomes, i.e. coincides, with the leading edge 241 of the (whole) rotor blade 20.

Regarding the trailing edge section 23 of the rotor blade 20, the main body trailing edge section 291 becomes the trailing edge section 23 of the rotor blade 20 for these spanwise regions without an attached aerodynamic device. In contrast, the device trailing edge section becomes the trailing edge section 23 of the rotor blade 20 for those spanwise regions where aerodynamic device 30 is attached to the main body 29 of the rotor blade 20. Likewise, either the main body trailing edge 292 or the device trailing edge 304 becomes the trailing edge 231 of the (whole) rotor blade 20.

At each spanwise position, a chord line 27 connecting the leading edge 241 with the trailing edge 231 can be defined. Note that the chord line 27 is perpendicular to the span 26. The shoulder 28 is defined in the region where the chord line comprises a maximum chord length.

Furthermore, the rotor blade 20 can be divided into an inboard section which comprises the half of the rotor blade 20 adjacent to the root section 21 and an outboard section which comprises the half of the rotor blade 20 which is adjacent to the tip section 22.

FIG. 2 also shows the edgewise direction 42, as defined for the inertial frame of reference of the rotor blade 20. The edgewise direction 42 basically coincides with the direction on orientation of the chord line 27. Note that the flapwise direction (not shown in FIG. 2) is perpendicular to the edgewise direction 42.

Figure 3:
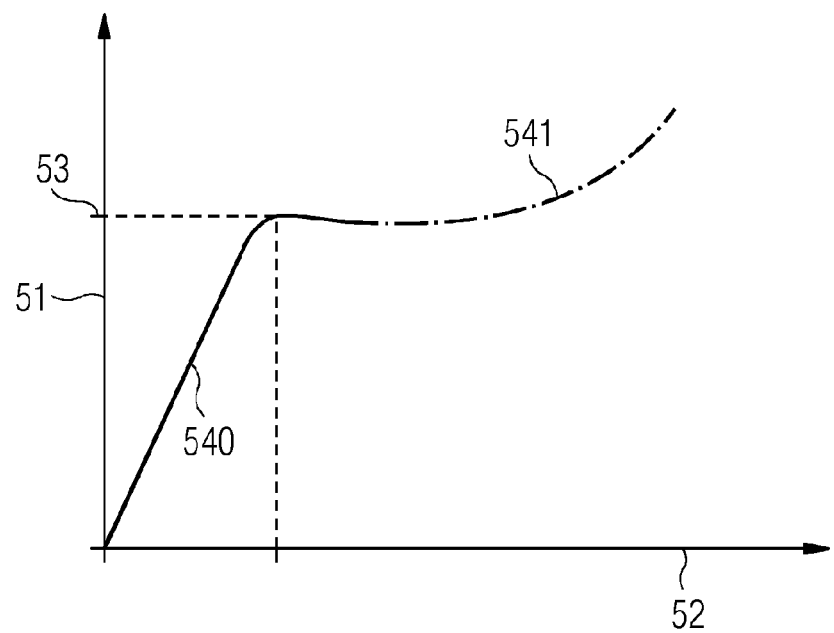
FIG. 3 shows the principle of buckling in a force-to-deflection curve.

FIG. 3 illustrates the principle of buckling. The principle of buckling is also referred to as a non-linear deformation of a material. This can be visualized by the force-deformation curve of the material. FIG. 3 shows the force component 51 acting in flapwise direction of a rotor blade, in dependence of the deflection 52 of the rotor blade in flapwise direction. It can be seen that for small forces up to a stability limit 53, see the first part of the curve 540, the amount of deflection that occurs is moderate. This changes suddenly, in other words abruptly, as the stability limit 53 is reached. In the second part 541 of the curve, only a small increase of the applied force 51 is necessary in order to obtain considerable deflection 52 of the rotor blade. Also note that in the exemplary illustration in FIG. 3, the relationship between the applied force 51 and the deflection 52 is linear in the first part 540 of the curve, but is non-linear in the second part 541 of the curve.

Figure 4:
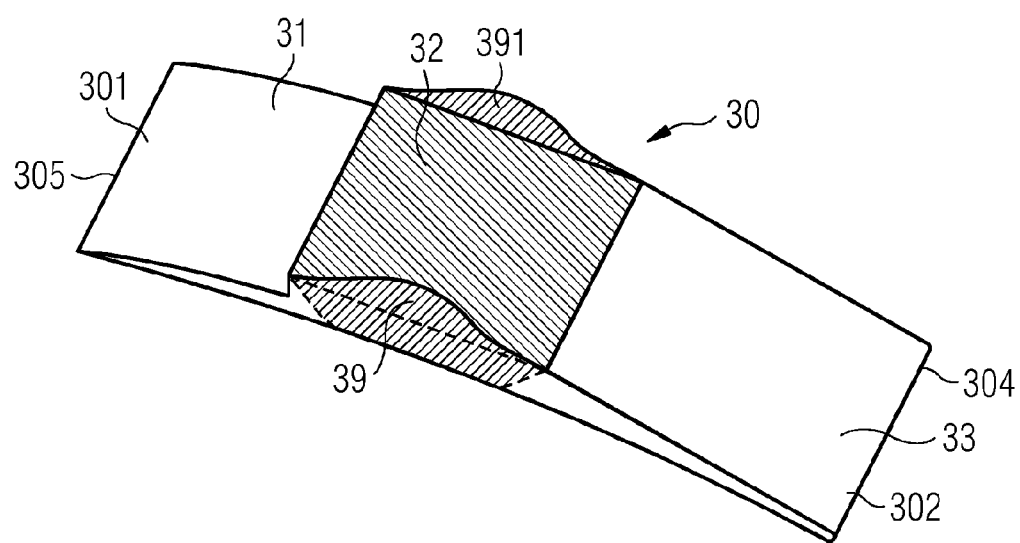
FIG. 4 shows an embodiment of an aerodynamic device having a flexible buckling section, a rigid attachment section and a rigid aerodynamic section.

FIG. 4 shows an example of an aerodynamic device 30 comprising an attachment section 31, a buckling section 32 and an aerodynamic section 33. The attachment section 31 is arranged and prepared for being attached to a main body of a rotor blade. Depending on the size and the profile of the area where the attachment section is configured to be attached to the main body, the shape and the size of the attachment section 31 is chosen. The edge section of the attachment section which in the attached state of the aerodynamic device 30 is directed towards the leading edge section of the rotor blade, is referred to as the device leading edge section 301. The edge of the device leading edge section 301 is referred to as the device leading edge 305.

Likewise, the edge section which is most distal from the leading edge section of the rotor blade is referred to as the device trailing edge section 302. The edge of the device trailing edge section 302 is referred to as the device trailing edge 304.

The buckling section 32 is between the attachment section 31 and the aerodynamic section 33. The buckling section 32 in the example of FIG. 4 comprises a stabilizer 39 and a further stabilizer 391.

The embodiment of FIG. 4 shows an aerodynamic device 30 which has a flexible buckling section 32. The flexible buckling section is made of rubber. This material choice ensures that the buckling section 32 is able to deform abruptly if a predetermined force level, i.e. which is referred to as the stability limit of the buckling section 32, is reached. Another advantage of using rubber material for the buckling section 32 is that it is well-suited to withstand significant local deformations without wearing out. In contrast to the flexible buckling section 32, the aerodynamic section 33 and the attachment section 31 are made of a stiff and rigid material. The aerodynamic device 30 may, for instance, be attached by means of bolts, rivets or an adhesive to the main body of the rotor blade.

FIGS. 5 to 22 illustrate exemplary embodiments of the invention.

Figure 5:
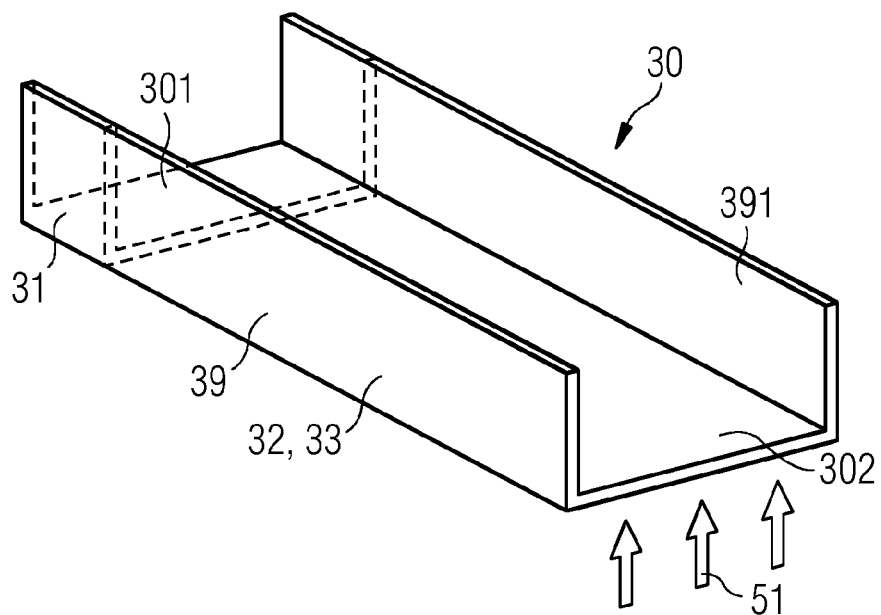
FIG. 5 shows a first embodiment of an aerodynamic device in an undeformed state.

FIG. 5 shows a first embodiment of an aerodynamic device 30 comprising the three already described sections, i.e. the attachment section 31, the buckling section 32 and the aerodynamic section 33. In the first embodiment, the buckling section 32 and the aerodynamic section 33 fall together. This means that one large section of the aerodynamic device 30 is both able to deform abruptly if a force which is applied in flapwise direction (or, in general, the force component in flapwise direction) reaches or exceeds the stability limit of the buckling section and is able to influence the aerodynamic properties of the aerodynamic device 30.

The first embodiment is shaped as in a U-shape. In other words, it comprises a plane and two stabilizers, namely a stabilizer 39 and a further stabilizer 391, the two stabilizers 39, 391 being arranged perpendicularly to the plane.

Figure 6:
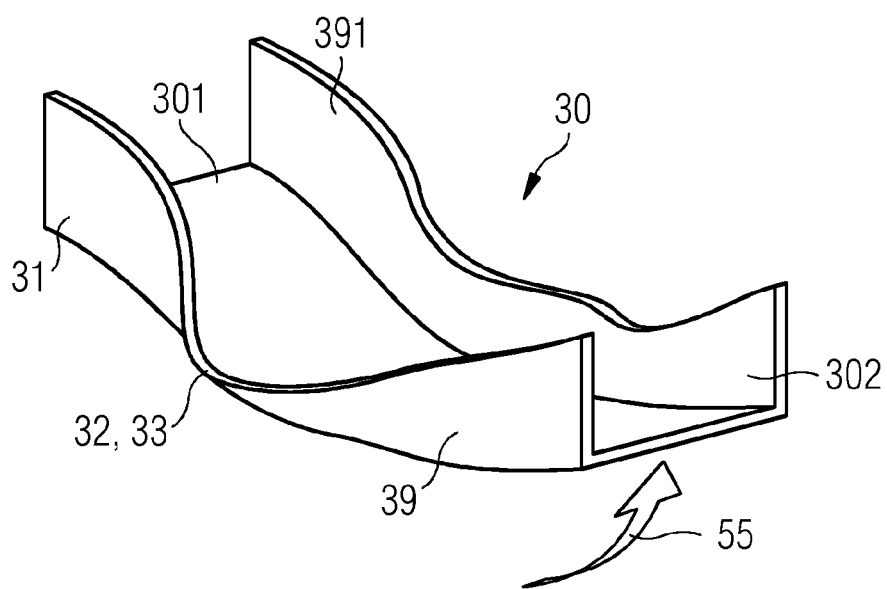
FIG. 6 shows the first embodiment of the aerodynamic device in a deformed state.

In can be seen in FIG. 6 that, if a force is applied in flapwise direction on the aerodynamic device, a bending moment 55 results, and the aerodynamic device 30 deforms. Deformation of the aerodynamic device 30 takes place at both the planar section and the stabilizers 39, 391. As a result, the aerodynamic device 30 is bent upwards and will thus influence the aerodynamic properties of the rotor blade in the desired manner. In particular, lift of the rotor blade may be reduced. Note that the deformation is reversible and that it occurs completely passively.

FIGS. 7 and 8 show a second embodiment of the invention. They show another aerodynamic device 30 with an attachment section 31 comprising a device leading edge section 301, and a buckling section 32 and an aerodynamic section 33. The aerodynamic section 33 comprises a device trailing edge section 302 and comprises a plurality of serrations 38. The purpose of the serrations 38 is mainly the reduction of noise that is generated during rotation of the rotor blade about the rotor axis of rotation.

In the example of FIG. 7, the aerodynamic device is arranged and prepared for being attached at the pressure side of a main body of a rotor blade at the trailing edge section. Furthermore, it is arranged and prepared that a force component 51 is acting on the aerodynamic device 30 such that if the force component 51 reaches the stability limit of the buckling section 32, the aerodynamic section 33 and also, at least partly, the buckling section 32 bend upwards towards the suction side of the rotor blade due to the bending moment 55. Note that the stabilizers 39, 391 bend as well during deformation, as can be well discerned in FIG. 8.

FIG. 9 shows a cross sectional view of the second embodiment. It can be seen that the stabilizer 39 and the further stabilizer 391 comprise an angle of approximately one hundred and thirty degrees relative to the planar part of the aerodynamic section. Having an angle of approximately one hundred and thirty degrees has the advantage that it is a good compromise between a high stability of the aerodynamic device for forces smaller than the stability limit and a positive ability of deformation for forces above the stability limit.

Figure 10:
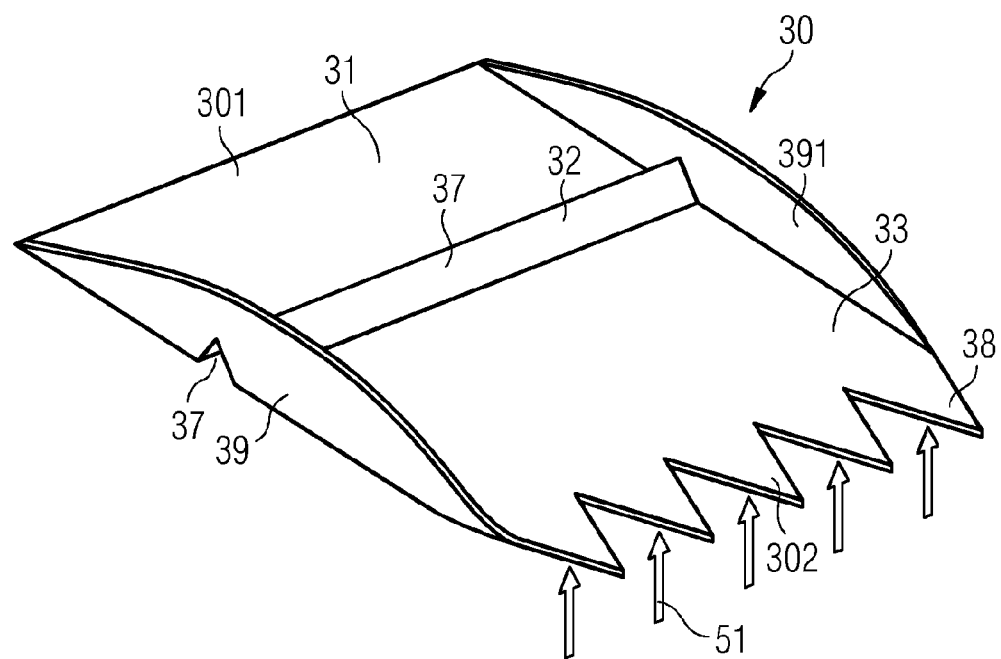
FIG. 10 shows a third embodiment of an aerodynamic device in an undeformed state.
Figure 11:
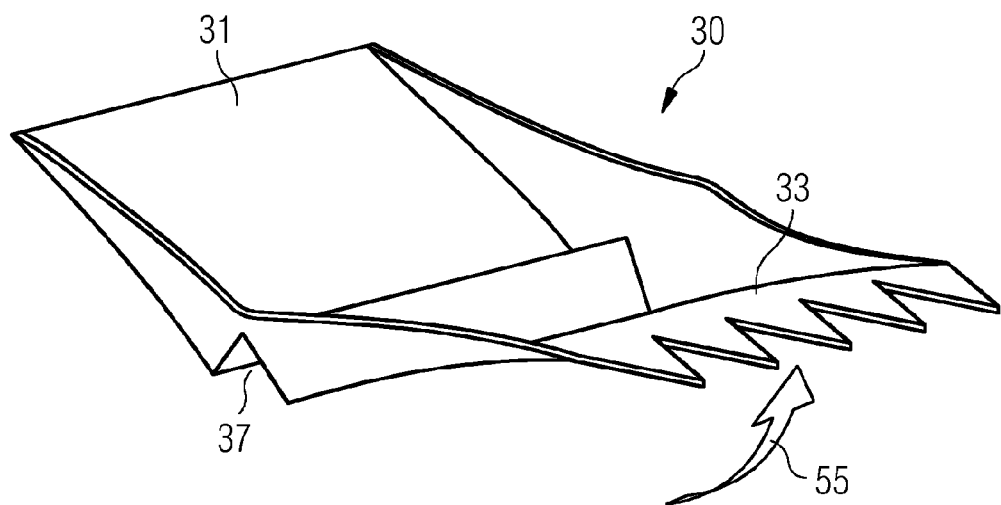
FIG. 11 shows the third embodiment of the aerodynamic device in a deformed state.

FIGS. 10 and 11 show a third embodiment of an aerodynamic device 30 comprising an attachment section 31, a buckling section 32 and an aerodynamic section 33. Again, the aerodynamic section 33 comprises a plurality of serrations 38 for reducing noise that is generated by the rotor blade of the wind turbine. Also similarly to the embodiment as shown in FIGS. 7 to 9, the aerodynamic device 30 comprises a stabilizer 39 and a further stabilizer 391 for reducing the deformation of the aerodynamic device 30 in substantially flapwise direction for forces being smaller than the stability limit of the buckling section 32. In the embodiment as shown in FIG. 10, the buckling element 32 comprises a corrugation 37. Thus, a corrugated hinge element is obtained. This has the advantage that deformation of the buckling element 32 is facilitated as can be seen in FIG. 11. This has the effect that contrary to the previous embodiment as shown in FIGS. 7 to 9, where the stabilizer 39 is bent and twisted upon deformation, the stabilizer 39 remains substantially unchanged and only the region around the corrugation 37 is deformed.

Figure 12:
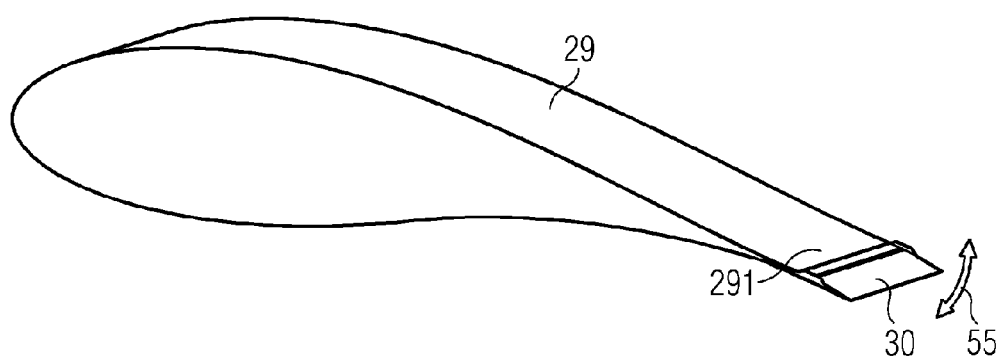
FIG. 12 shows a fourth embodiment of an aerodynamic device as attached to a main body of a rotor blade.

FIG. 12 shows a fourth embodiment of the invention. It shows an aerodynamic device 30 that is attached to a main body 29 at a main body trailing edge section 291 with the aerodynamic device 30. Reversible deformation of the aerodynamic device 30 occurs basically due to the bending moment 55.

Figure 13:
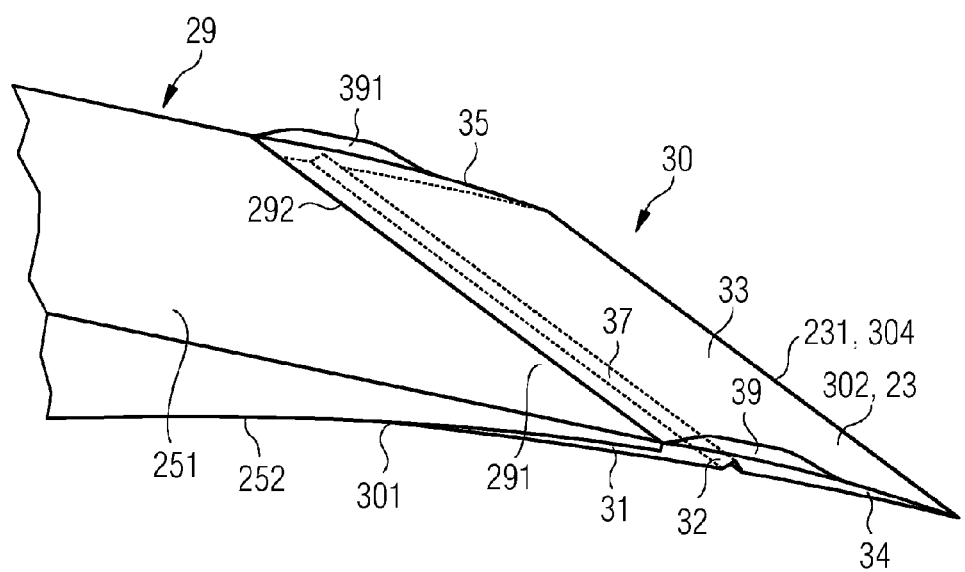
FIG. 13 shows an enlarged view of the fourth embodiment of the aerodynamic device.

FIG. 13 shows an enlarged view of the aerodynamic device 30 attached to the main body 29 of the rotor blade as shown in FIG. 12. The aerodynamic device 30 is attached to the main body 29 at the main body trailing edge section 291. More specifically, the aerodynamic device 30 is attached at the pressure side 252 of the rotor blade. The aerodynamic device comprises a stabilizer 39 at a radially inner edge 34 and a further stabilizer 391 at a radially outer edge 35. The buckling section 32 comprises a corrugation for enabling a more accurate and controlled deformation movement of the aerodynamic device 30. As the aerodynamic device 30 is attached to the main body trailing edge section 291, the device trailing edge section 302 becomes the trailing edge section 23 of the whole rotor blade. Likewise, the device trailing edge 304 becomes the trailing edge 231 of the (whole) rotor blade.

Figure 14:
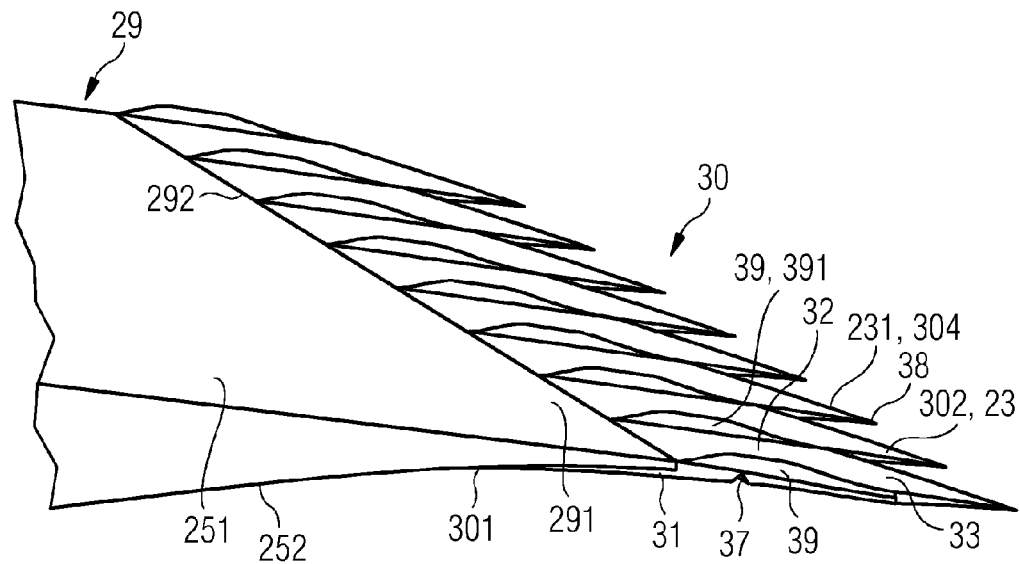
FIG. 14 shows a fifth embodiment of an aerodynamic device.

FIG. 14 shows a fifth embodiment of the invention, namely a segmented aerodynamic device. In other words, it describes and discloses a plurality of aerodynamic devices 30 which are one next to the other along the span of the rotor blade. As the aerodynamic devices 30 comprise stabilizers 39 and adjacent stabilizer of a first aerodynamic device is closely connected with an adjacent further stabilizer of the other aerodynamic device. As the stabilizers 39, 391 are more densely spaced, this embodiment yields more control of the airflow at the trailing edge. Also note the serrations 38 for reducing aerodynamically induced noise.

Figure 15:
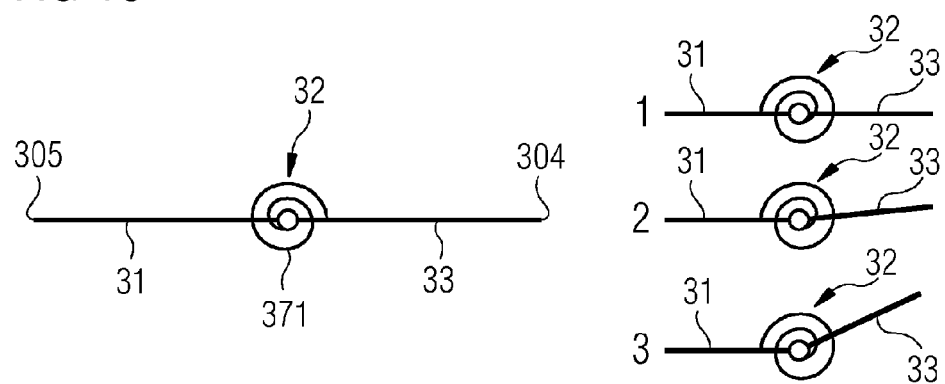
FIG. 15 shows a sixth embodiment of an aerodynamic device.

FIG. 15 shows a sixth embodiment of the invention. It shows an attachment section 31, an aerodynamic section 33 and a buckling section 32, wherein the buckling section 32 is formed as a non-linear spring 371.

The spring 371 in an unloaded state is depicted in "1" on the right-hand side of FIG. 15. The feature of the non-linearity of the spring signifies that for a whole range of forces which are smaller than the stability limit of the spring, the deviation of the aerodynamic section 33 relative to the attachment section 31 is relatively small, see the state "2" on the right-hand side of FIG. 15. However, when the stability limit is reached, an abrupt change in the orientation of the angle of the aerodynamic device 33 relative to the attachment section 31 is possible, see the state "3" on the right-hand side of FIG. 15.

FIGS. 16 to 19 show a seventh embodiment of an aerodynamic device 30 of a rotor blade 20 of a wind turbine in a cross sectional view.

The rotor blade 20 comprises a main body 29 and the aerodynamic device 30. The aerodynamic device 30 comprises an attachment section 31, a buckling section 32 and an aerodynamic section 33. The aerodynamic device 30 is connected to the main body 29 at the main body trailing edge section 291. The aerodynamic device 30 is connected to the main body trailing edge section 291 via the attachment section 31 of the aerodynamic device 30.

The main body 29 comprises a leading edge 241 and a main body trailing edge 292. The leading edge 241 and the main body trailing edge 292 are connected by a straight line. The straight line is referred to as the chord line 27.

The main body 29 furthermore comprises a leading edge section 24 which is delimited by a line which is perpendicular to the chord line 27 at a chordwise position of 20% chord length 271, as seen from the leading edge 241. Likewise, the main body trailing edge section 291 is defined and delimited by a line 272 which is perpendicular to the chord line 27 at a chordwise position of 80% chord length 272, as seen from the leading edge 241.

Figure 16:
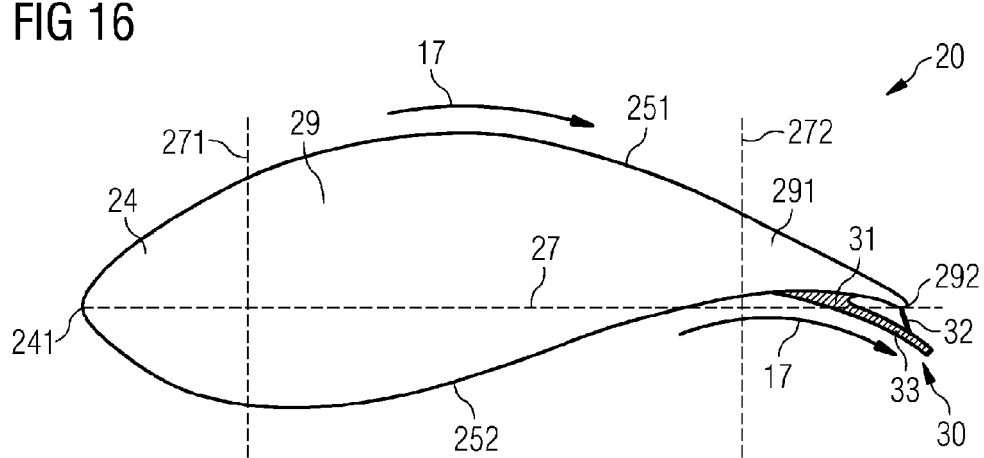
FIG. 16 shows a seventh embodiment of an aerodynamic device in an undeformed state.
Figure 17:
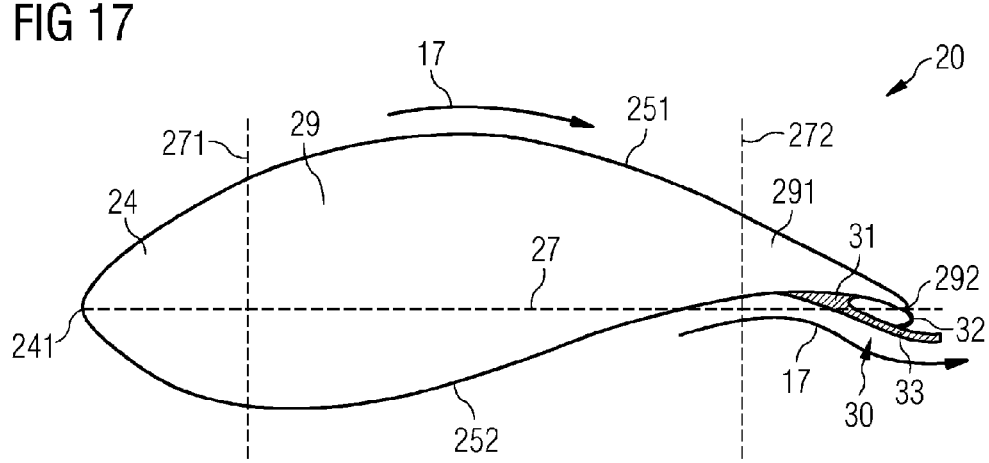
FIG. 17 shows the seventh embodiment of the aerodynamic device in a deformed state.

In FIGS. 16 and 17, the part between the leading edge 241 and the main body trailing edge 292 and substantially "above" the chord line 27 is referred to as the suction side 251 of the rotor blade 20, while the part between the leading edge 241 and the main body trailing edge 292 and substantially "below" the chord length 27 is referred to as the pressure side 252.

The aerodynamic device 30 is connected to the main body trailing edge section 291 once directly via the attachment section 31 and, secondly, via the buckling section 32.

The difference between the FIGS. 16 and 17 is that in FIG. 16 the buckling section 32 is undeformed, while in FIG. 17 the buckling section 32 is deformed. As a consequence, in FIG. 16, an air flow 11 which is flowing from the leading edge section 24 to the main body trailing edge section 291 is deflected at the main body trailing edge section 291 in direction to the pressure side 252. This is a scenario which is expected for forces, i.e. loads, which are smaller than the stability limit and which are acting on the buckling section 32. In the scenario shown in FIG. 16 the air flow 11 is deflected such that the lift of the rotor blade 20 is increased compared to an alternative arrangement without any aerodynamic device 30.

FIG. 17, in contrast, shows a scenario where the buckling section 32 is deformed due to an extreme load applied on the buckling section 32 in a direction substantially perpendicular to the chord line 27. The deformation of the buckling section 32 results in a deflection of the air flow 11 flowing from the leading edge section 24 to the main body trailing edge section 291. The deflection of the air flow 11 is such that it exits the main body trailing edge section 291 not towards the pressure side 252 of the rotor blade 20 but towards the suction side 251 of the rotor blade 20. This results in an alleviation or reduction of the load on the rotor blade 20. Note that the alleviation is due to a passive mechanism.

Figure 18:
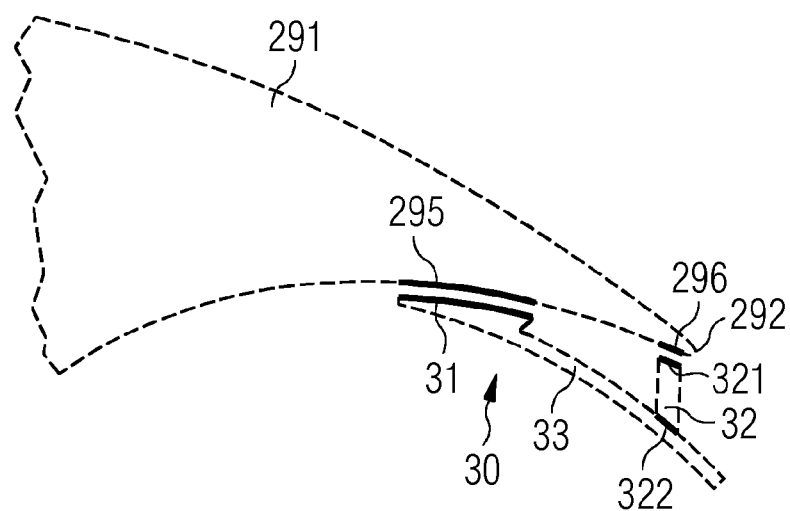
FIG. 18 shows the seventh embodiment of an aerodynamic device in an undeformed state.

FIG. 18 shows a detailed view of how the aerodynamic device 30 is attached to the main body trailing edge section 291. First, it shows that the attachment section 31 of the aerodynamic device 30 is attached at a predetermined first contact area 295 of the main body trailing edge section 291. Second, it shows that the buckling section 32 comprises a first end 321 and a second end 322. The first end 321 is attached to the main body trailing edge section 291 at a predetermined second contact area 296. The second end 322 of the buckling section 32 is inherently connected with the aerodynamic section 33 of the aerodynamic device 30.

Once the attachment section 31 of the aerodynamic device 30 and the first contact area 295 of the main body trailing edge section 291 are firmly connected and once that the first end 321 of the buckling section 32 and the second contact area 296 of the main body trailing edge section 291 are firmly connected, the rotor blade is fully operable. Under the assumption that the stability limit of the buckling section is set wisely, the flexible arrangement of the aerodynamic device 30 with regard to the main body 29 of the rotor blade 20 can be exploited beneficially in order to efficiently manipulate the load acting on the wind turbine rotor blade 20, and even the wind turbine as a whole.

Figure 19:
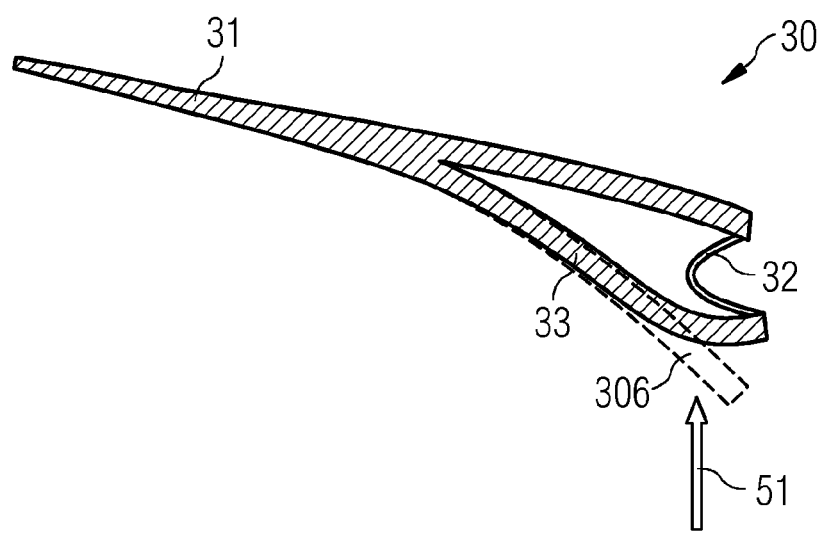
FIG. 19 shows the seventh embodiment of an aerodynamic device in a deformed state.

FIG. 19 shows an exemplary design of an aerodynamic device 30 with a buckling section 32. The buckling section 32 is made of thin plastics material. The attachment section 31 of the aerodynamic device 30, which is arranged and prepared for being connected to a predetermined first contact area of a rotor blade (not shown), can be seen. Furthermore, the force component 51 of a compressive force, acting in flapwise direction of the rotor blade, is shown. The force component 51 of the compressive force exceeds the stability limit of the buckling section 32, thus the buckling section 32 deforms significantly. For comparison, the undeformed aerodynamic section 306 is shown in dashed lines.

Figure 20:
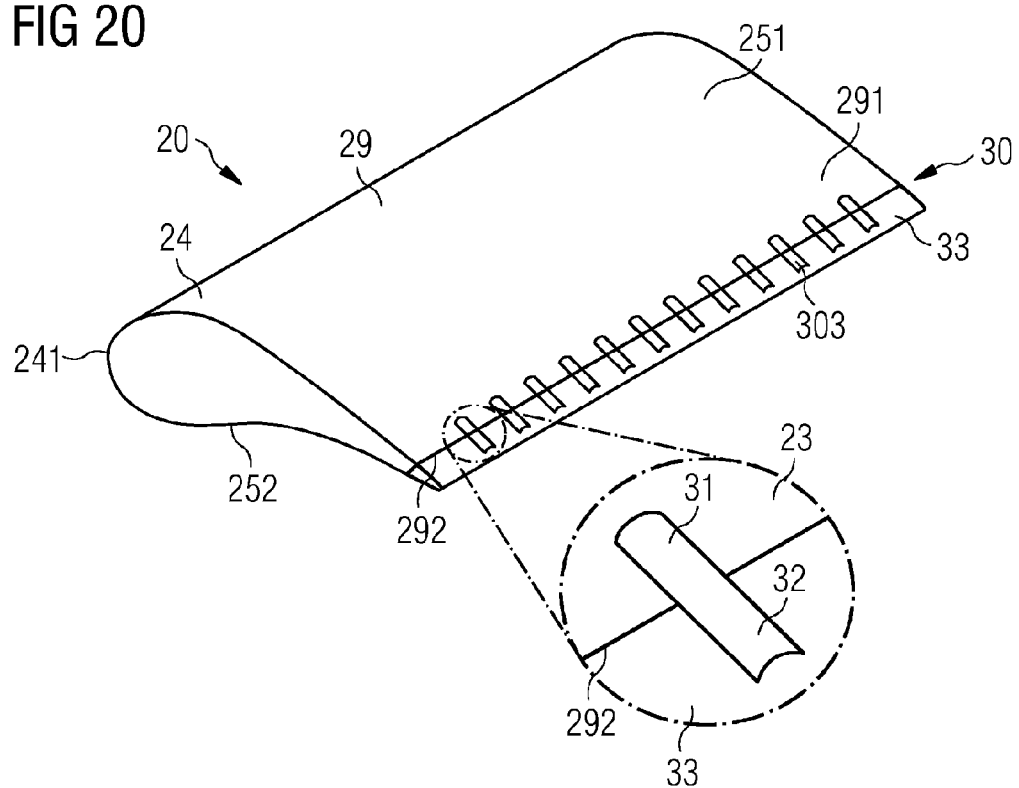
FIG. 20 shows an eighth embodiment of an aerodynamic device having a plurality of connection members.
Figure 21:
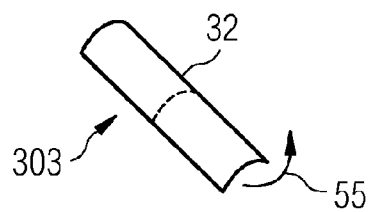
FIG. 21 shows an embodiment of the connection member of the eighth embodiment in an undeformed state.
Figure 22:
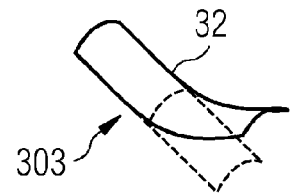
FIG. 22 shows an embodiment of the connection member of the eighth embodiment in a deformed state.

FIGS. 20 to 22 show an eighth embodiment of the invention. It comprises a rotor blade 20 consisting of a main body 29 and an aerodynamic device 30. The aerodynamic device 30 comprises a plurality of connection members 303 for connecting the aerodynamic section 33 of the aerodynamic device 30 to the main body trailing edge section 291 of the main body 29. Each connection member 303 comprises a buckling section 32 and an attachment section 31. The connection members 303 are made of thin plastics material.

The rotor blade 20 comprises a suction side 251, a pressure side 252, a leading edge 241 and a main body trailing edge 292. The main body trailing edge 292 has the shape of a flat back. The aerodynamic device 30 effectively prolongs the chord length of the chord lines 27 (not shown) of the main body 29, at least during the undeformed state of the buckling sections 32 as shown in FIG. 20. Each connection member 303 is shaped as a slightly curved strip. The slight curvature gives additional stability to the connection member 303.

FIG. 21 illustrates the connection member 303 as such in a undeformed state. It can be seen that it is arranged and prepared such that a bending moment 55 acts on one of the ends of the connection member 303.

Finally, FIG. 22 shows the same connection member 303 as in FIG. 21 in a deformed state. The influence of the bending moment 55 acting on the connection member 303 can be seen. The impact of a set of deformed connection members 303 on the rotor blade 20 as shown in FIG. 20 can be imagined as follows: The aerodynamic section 33 of the aerodynamic device 30 would snap towards the suction side 251 and, thus, the wind flow characteristics, in particular at the main body trailing edge section 291, change significantly.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade for a wind turbine, the rotor blade comprising:
   a main body defining a pressure side and a suction side of the rotor blade, the main body having a main body trailing edge section, a leading edge section, and a span; and
   an aerodynamic device, the aerodynamic device having an attachment section for attaching the aerodynamic device to the main body trailing edge section along a portion of the span, an aerodynamic section for influencing the aerodynamic properties of the rotor blade, and a buckling section to control a configuration of the aerodynamic section with regard to the main body;
   wherein the aerodynamic device has a device trailing edge that extends past the main body trailing edge section within the portion of the span in a direction distal to the leading edge section of the main body;
   wherein the aerodynamic device is configured such that the aerodynamic device:
      deforms elastically for a force component below an elasticity limit acting in flapwise direction on the buckling section, and
      deforms abruptly if a force component of a size that is within a predetermined range from of a stability limit of the buckling section acts in flapwise direction on the buckling section,
   wherein the configuration of the aerodynamic section with regard to the main body is changed if the buckling section deforms abruptly, and load on the rotor blade is alleviated due to the change of the configuration of the aerodynamic section.

2. The rotor blade according to claim 1, wherein the aerodynamic device is shaped as a flap.

3. The rotor blade according to claim 1, wherein the aerodynamic section of the aerodynamic device comprises a plurality of serrations to reduce emission of noise.

4. The rotor blade according to claim 1, wherein at least the buckling section of the aerodynamic device is made of rubber and/or silicone to realize the abrupt deformation if a force component of the size that is within a predetermined range from of the stability limit of the buckling section acts in flapwise direction on the buckling section.

5. The rotor blade according to claim 1, wherein the attachment section and/or the aerodynamic section of the aerodynamic device are substantially rigid with regard to the force component acting in flapwise direction on the aerodynamic device.

6. The rotor blade according to claim 1, wherein the aerodynamic device comprises a device leading edge section and a device trailing edge section, the device leading edge section being attached to the main body trailing edge section, and the device trailing edge section builds the trailing edge section of the rotor blade.

7. The rotor blade according to claim 1, wherein the aerodynamic device comprises at least one stabilizer for reducing the deformation of the aerodynamic device in substantially flapwise direction, for the force component being smaller than the stability limit of the buckling section.

8. The rotor blade according to claim 7, wherein the at least one stabilizer extends in substantially chordwise direction of the rotor blade.

9. The rotor blade according to claim 7, wherein the at least one stabilizer delimits the aerodynamic device at a radially inner edge of the aerodynamic device, and a further stabilizer delimits the aerodynamic device at a radially outer edge of the aerodynamic device.

10. The rotor blade according claim 7, wherein the at least one stabilizer is attached to the buckling section by an angle which is smaller than 150 degrees.

11. The rotor blade according claim 7, wherein the at least one stabilizer is attached to the buckling section by an angle of substantially 90 degrees.

12. The rotor blade according to claim 7, wherein the at least one stabilizer is bent towards the pressure side or towards the suction side of the rotor blade.

13. The rotor blade according to claim 7, wherein the at least one stabilizer comprises a corrugation to control more accurately the abrupt deformation of the buckling section if the force component of the size that is within a predetermined range from of the stability limit of the buckling section acts in flapwise direction on the buckling section.

14. The rotor blade according to claim 1, wherein the buckling section comprises a nonlinear spring to realize the abrupt deformation if the force component of the size that is within a predetermined range from of the stability limit of the buckling section acts in flapwise direction on the buckling section.

15. The rotor blade according to claim 1, wherein the buckling section comprises a first end and a second end, the first end is attached to the main body trailing edge section, and the second end is attached to the aerodynamic section of the aerodynamic device.

16. The rotor blade according to claim 1, wherein the aerodynamic device comprises a plurality of connection members for connecting the aerodynamic section of the aerodynamic device to the main body trailing edge section, and each connection member of the plurality of connection members comprises a buckling section and an attachment section.

17. The rotor blade according to claim 10, wherein the angle is smaller than 120 degrees.

18. An aerodynamic device, comprising:
an attachment section for attaching the aerodynamic device to a main body trailing edge section along a portion of a span of a rotor blade for a wind turbine,
an aerodynamic section for influencing the aerodynamic properties of the rotor blade, and
a buckling section to control a configuration of the aerodynamic section with regard to a main body of the rotor blade;
wherein the aerodynamic device has a device trailing edge that extends past the main body trailing edge section within the portion of the span in a direction distal to the leading edge section of the main body;
wherein the aerodynamic device is configured such that the aerodynamic device:
deforms elastically for a force component below an elasticity limit acting in flapwise direction on the buckling section, and
deforms abruptly if a force component of a size that is within a predetermined range from a stability limit of the buckling section acts in flapwise direction on the buckling section,
wherein the configuration of the aerodynamic section with regard to the main body is changed if the buckling section deforms abruptly, and load on the rotor blade is alleviated due to the change of the configuration of the aerodynamic section.

* * * * *